US012551909B2

(12) United States Patent
Pennella

(10) Patent No.: US 12,551,909 B2
(45) Date of Patent: Feb. 17, 2026

(54) NARROW POINT ELECTROSTATIC SPRAY NOZZLE ASSEMBLY AND LUBRICANT DISPENSING SYSTEM

(71) Applicant: Spraying Systems Co., Wheaton, IL (US)

(72) Inventor: Paul Pennella, Westford, MA (US)

(73) Assignee: Spraying Systems, Wheaton, IL (US)

( * ) Notice: Subject to any disclaimer, the term of this patent is extended or adjusted under 35 U.S.C. 154(b) by 268 days.

(21) Appl. No.: 18/228,995

(22) Filed: Aug. 1, 2023

(65) Prior Publication Data

US 2024/0042466 A1 Feb. 8, 2024

Related U.S. Application Data

(60) Provisional application No. 63/394,469, filed on Aug. 2, 2022.

(51) Int. Cl.

*B05B 5/035* (2006.01)
*B05B 5/053* (2006.01)
*F16N 7/00* (2006.01)

(52) U.S. Cl.

CPC ............ *B05B 5/035* (2013.01); *B05B 5/0536* (2013.01); *F16N 7/00* (2013.01); *F16N 2210/33* (2013.01); *F16N 2280/02* (2013.01)

(58) Field of Classification Search

CPC ..... B05B 1/14; B05B 13/0278; B05B 5/0255; B05B 5/035; B05B 5/043; B05B 5/0533; B05B 5/0536; B05B 5/14; F16N 2210/24; F16N 2210/33; F16N 2280/02; F16N 7/00; F16N 7/34

See application file for complete search history.

(56) References Cited

U.S. PATENT DOCUMENTS 4,214,709 A * 7/1980 Scull .......................... B05B 5/03 239/707
4,241,880 A * 12/1980 Hastings ................... B05B 5/03 239/691
4,721,255 A * 1/1988 Lind ..................... B05B 5/0533 239/690
4,801,086 A 1/1989 Noakes
5,176,321 A * 1/1993 Doherty .................. F16N 15/00 239/3

(Continued)

FOREIGN PATENT DOCUMENTS

EP 0250102 A2 12/1987

OTHER PUBLICATIONS

International Bureau, International Search Report in International Application No. PCT/US2023/029219, mailed Dec. 5, 2023.

*Primary Examiner* — Jesse S Bogue

(74) *Attorney, Agent, or Firm* — Leydig, Voit & Mayer, Ltd.

(57) ABSTRACT

A liquid dispensing system for dispensing highly viscous liquids such as lubricating oil. The system includes a nozzle body and elongated electrode that define an annular liquid flow passage communicating with a protruding conically configured terminal end of the electrode. An end cap of the nozzle body defines a plurality of circumferentially spaced discharge orifices about the electrode for controlling the discharge of electrically charged liquid onto the terminal end of the electrode for direction therefrom in a thin line, having a width of less than 0.06 inches.

18 Claims, 3 Drawing Sheets

(56) References Cited

U.S. PATENT DOCUMENTS

| | | | | |
|---|---|---|---|---|
| 6,227,465 | B1 * | 5/2001 | Kelly | B05B 5/10<br>239/690 |
| 9,962,720 | B2 * | 5/2018 | St. Peter | B05B 5/03 |
| 10,543,495 | B2 | 1/2020 | Ackerman et al. | |
| 11,134,694 | B2 * | 10/2021 | McAninch | C10M 111/04 |
| 11,338,308 | B2 * | 5/2022 | Asami | A61M 35/003 |
| 11,896,716 | B2 * | 2/2024 | Popescu | A61K 47/44 |
| 2005/0194476 | A1 * | 9/2005 | Muljono | B05B 1/202<br>239/707 |
| 2020/0155423 | A1 * | 5/2020 | Ito | A61K 8/345 |

* cited by examiner

NARROW POINT ELECTROSTATIC SPRAY NOZZLE ASSEMBLY AND LUBRICANT DISPENSING SYSTEM

CROSS-REFERENCE TO RELATED APPLICATION

This patent application claims the benefit of U.S. Provisional Patent Application No. 63/394,469, filed Aug. 2, 2022, which is incorporated by reference.

FIELD OF THE INVENTION

The present invention relates generally to electrostatic spray nozzle assemblies, and more particularly, to lubricating systems for directing lubricants onto metal parts by use of such electrostatic spray nozzle assemblies.

BACKGROUND OF THE INVENTION

Equipment in many industries have various components that must be lubricated continuously at very specific locations for continuous proper operation. One such application is the canning industry where unpainted aluminum cans are placed on carrier pins of sprocket driven chain conveyers that direct the cans through a decorator oven where they are painted and cured for their intended usage. The decorator ovens can reach internal temperatures up to 200 C in which lubricating oil for the chain rollers can evaporate, increasing wear on the bearing pins. Without proper lubrication on the chain, the life expectancy of the chain is measured in days. In contrast, properly lubricated chains can have life expectancies of between 18 and 24 months. The need has continuously existed for technology to enhance the life of such chain conveyors.

One of the most common methods of chain lubrication is a brush style oiler. The brush is placed in proximity to the passing chain so that as the chain passes the brush can sweep oil onto every part of the interior of the chain. This method, however, is very messy and if oil splatters onto the interior of the cans, the contaminated cans must be discarded since the oil prevents proper coating While electrostatic spray nozzles have been developed, they have not been effective for spraying higher viscosity oils. Current trends in the industry have shown companies relying more heavily on higher viscosity oil for lubrication. High viscosity oils adhere to the machine components longer helping to extend the life of the equipment. This further enables less oil consumption for combatting rising production cost. Moreover, when the electrostatic spray nozzle is operated with reduced or minimal lubricant flow for pointed thin line discharge resulting voids or interruption in the lubricant supply can cause damaging arcing between the electrode and the metal component being sprayed.

To assist in atomization of such highly viscous liquids, electrostatic spray nozzle assemblies have utilized pressurized air assisted atomization of the liquid. A problem with such pressurized air atomizing designs is that they lack precision. The air atomization of a lubricant combined with the electrostatics effectively turns the nozzle system into a spraying system more akin to an electrostatic paint spraying system. The problem with such systems is that the spray is conic in nature and difficult to lubricate relatively small target areas without saturating the area outside the target. That results in wasteful overspray adversely affecting the work environment and requiring difficult cleanup. A further drawback of such pressurized air atomizing spray nozzle designs is that compressed air and compressed air systems are a substantial cost to the user.

OBJECTS OF THE INVENTION

It is an object of the present invention to provide an electrostatic spray nozzle assembly and dispensing system utilizing such spray nozzle assembly that is more effective in precisely and reliably spraying thin line high viscosity liquids, such as oil and other lubricants onto moving metal parts.

Another object to provide an electrostatic spraying system as characterized above that is operable without the need for pressurized air assisted atomization in breaking up the liquid into a thin line particle discharge.

A further object is to provide an electrostatic spraying system of the foregoing type that is operable for directing a precise liquid spray pattern onto small moving targets without wasteful overspraying that can harm the environment and cause costly cleanup.

Yet another object is to provide an electrostatic lubricant dispensing system of the above kind in which the spray nozzle assembly precisely and reliably controls the discharge of lubricant in a manner for directing a very thin line string or series of droplets without the potential for electrical arcing between the charging electrode and metal objects being coated.

Still another object is to provide an electrostatic spray nozzle assembly and lubricant dispensing system of the foregoing type that is relatively simple in design and lends itself to economical and reliable usage.

Other objects and advantages of the invention will become apparent when reading the following detailed description and upon reference to the drawings in which:

Figure 1:
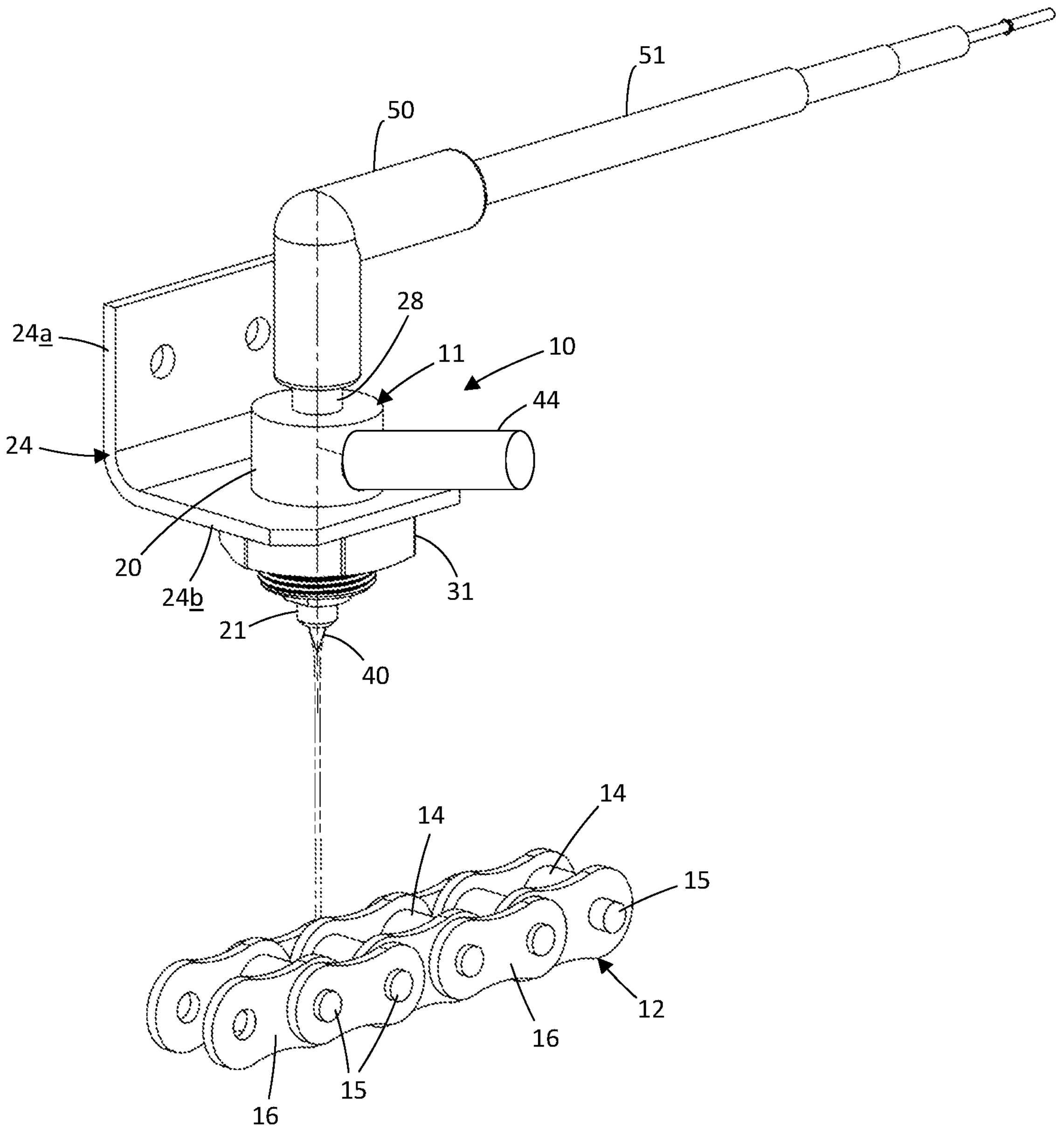
FIG. 1 is a perspective of an illustrated liquid dispensing system having a hydraulic electrostatic spray nozzle assembly in accordance with the invention for directing highly viscous liquids, such as oils or other lubricants, onto a sprocket driven chain without pressurized air atomization of the liquid.

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF PREFERRED EMBODIMENT

Referring now more particularly to FIG. 1 of the drawings, there is shown an illustrative liquid dispensing system 10 having a hydraulic electrostatic spray nozzle assembly 11 in accordance with the invention for spraying highly viscous liquids, such as oils and other lubricants for specific direction and application. For purposes herein, the term "hydraulic spray nozzle assembly" is intended to mean a spray nozzle assembly for spraying and directing liquids without pressurized air assisted atomization and direction of the liquid. The illustrated dispensing system 10 is designed for directing a thin line string or series of droplets of highly viscous oil or other lubricant onto the pin and roller junctions of a sprocket driven chain 12. Such chains typically comprise longitudinally spaced rollers 14 supported by respective pins 15, which in turn are connected by links 16 on opposite sides of the rollers 14. It is essential to lubricate the junction between the pins 15 and rollers 14 for proper operation in many applications to prevent wear and chain failure.

Figure 2:
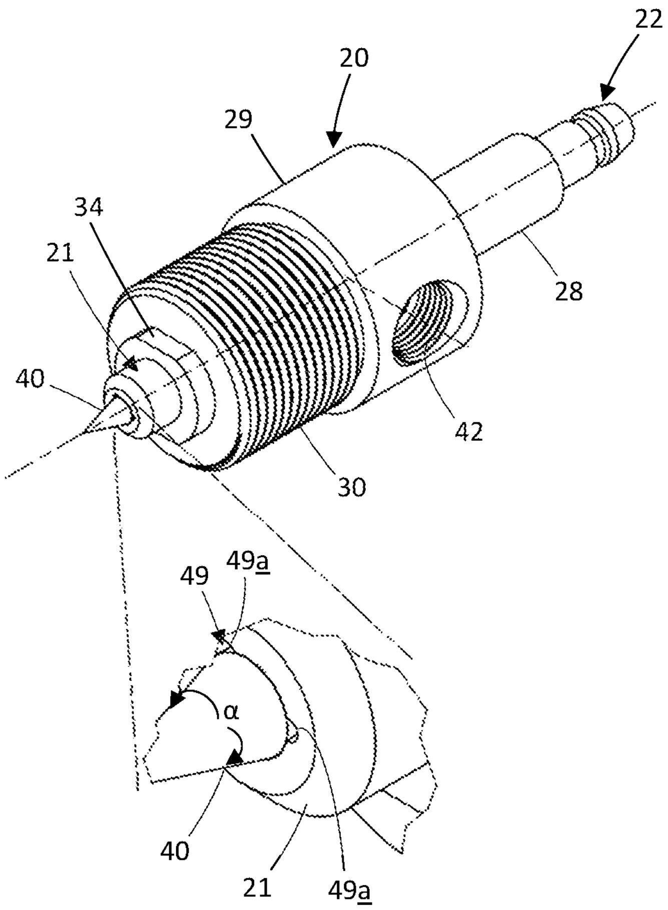
FIG. 2 is a perspective of the electrostatic spray nozzle assembly shown in FIG. 1, with the terminal pointed end of the electrode broken out in enlarged fashion.
Figure 3:
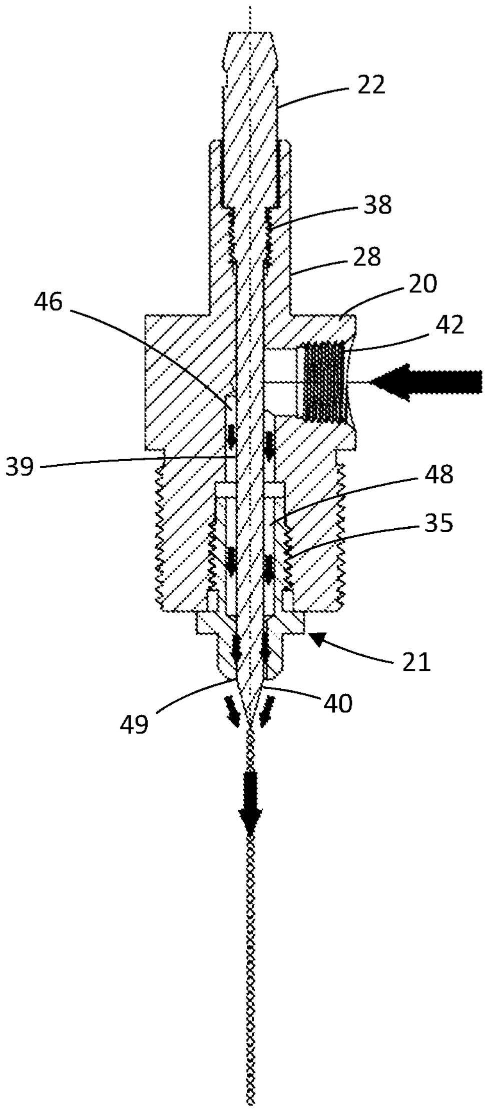
FIG. 3 is an enlarged longitudinal section of the illustrated electrostatic spray nozzle assembly.
Figure 4:
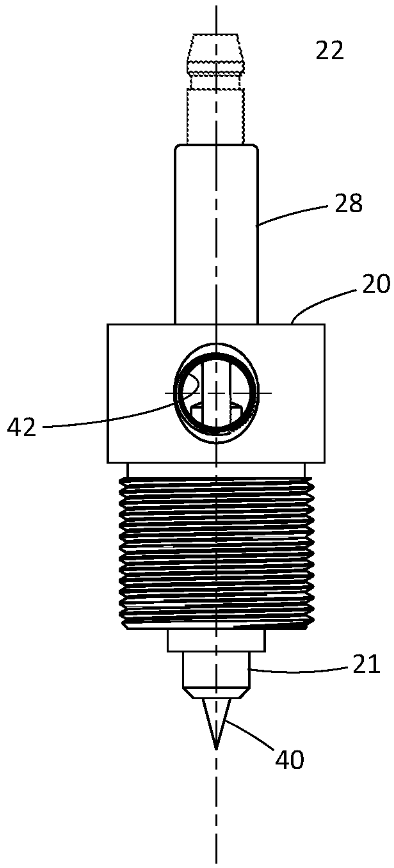
FIG. 4 is a side elevational view of the electrostatic spray nozzle assembly shown in FIG. 3.
Figure 5:
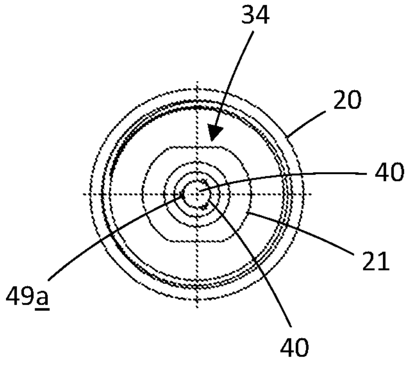
FIG. 5 is a downstream end view of the spray nozzle assembly shown in FIG. 4.

The illustrated hydraulic electrostatic spray nozzle assembly 11 basically comprises a nozzle body 20 having a downstream end in the form of an end cap 21 and an electrode 22 supported within the nozzle body 20 extending through the nozzle body 20 and end cap 21. The illustrated spray nozzle assembly 11 is supported by an L shaped bracket 24 having a vertical leg 24*a* for securement to an appropriate mounting structure and a horizontal leg 24*b* having a central opening for supporting the nozzle body 20. The nozzle body 20 in this case, as depicted in FIGS. 2-4, includes a relatively small diameter upstream section 28, a relatively larger diameter intermediate section 29, and in a lower externally threaded cylindrical section 30 somewhat smaller in diameter than the intermediate section 29 and the bracket opening. The intermediate section 29 of the nozzle body 20 is supported on the horizontal bracket leg 24*b* with the lower threaded section 30 depending from the bracket 24 and secured thereto by a nut 31. A lower protruding end of the end cap 21 in this instance is formed with flats 34 to facilitate wrench tightening and removal of the end cap 21. The end cap 21 in this case has an externally threaded upstream hub 35 secured in threaded engagement with a threaded cavity in a downstream end of the nozzle body, as depicted in FIG. 3. It will be understood that while the illustrated nozzle body 20 and end cap 21 are individual parts, alternatively they could be integrally formed as a single part.

The electrode 22 has a generally cylindrical configuration with an upstream threaded section 38 (FIG. 3) secured in sealed engaging relation within the nozzle body 20, a smaller diameter downstream cylindrical section 39 extending through the nozzle body 20 and end cap 21, and a downstream end 40 protruding from the end cap 21. The nozzle body 20 has a liquid inlet 42 on a side thereof coupled to a liquid supply line 44 for communication with a liquid supply, such as a supply of high viscosity oil or other lubricant. The liquid inlet 42 communicates with an annular passage 46 between an internal cylindrical chamber of the nozzle body 20 and the electrode 22, a downstream passage 48 between the electrode 22 and an upstream cylindrical chamber of the end cap 21, and a metering section 49 of the end cap 21 (FIGS. 2 and 3) about the protruding end 40 of the electrode.

The electrode 22 in this instance has an upstream end extending above the nozzle body 20 coupled by a right angle fitting 50 to a high voltage cable 51 connected to a high voltage source, such as a positive power supply (FIG. 1). With the electrode 22 charged by a high voltage power supply it will be seen that liquid fed to the inlet 42 will be electrically charged during its travel along a substantial length of the electrode 22 through the nozzle body 20 and end cap 21. Moreover, the nozzle body 20 and end cap 21 are made of an insulating material for allowing the electrical charge to be transmitted exclusively to the liquid as it is directed through the spray nozzle assembly 20.

In keeping with an important feature of this embodiment, the end cap metering section 49 about the protruding end of the electrode is defined by a plurality of relatively small circumferentially spaced metering orifices 49*a* (FIG. 2) in the end cap 21 for precisely controlling the discharge of fluid along the protruding end 40 of the electrode 22. In the illustrated embodiment, three circumferentially spaced metering orifices 49*a* are disposed in a downstream end of the end cap 21 for optimum direction of liquid along the protruding end 40 of the electrode 22 without excessive wasteful discharge or interruptions in the liquid flow that can create harmful electrical arcing. The illustrated metering orifices 49*a* have half-moon configurations with the curved sides of the orifices 49*a* extending radially outward of the circumferential wall of the end cap 21 surrounding the electrode 22 as depicted in FIG. 2. The metering orifices 49*a* are designed to allow sufficient liquid to circumscribe the terminal end 40 of the electrode 22 while restricting flow for fine point distribution and direction to specific target areas without voids or inconsistencies in the discharge. The electrostatic charge on the liquid has been found to draw the liquid out of the orifices 49*a* more quickly than under normal pressure conditions that can cause cyclic breaks in the stream. To control the flow, the half-moon configured metering orifices are relatively small in size with a total open or flow area of the orifices being only about 0.0003 square inches. Three such metering orifices 49*a*, as depicted in the illustrated embodiment, have been found to provide optimum flow for completely surrounding to the downstream end 40 of the electrode 22. Alternatively, two to six appropriately sized discharge orifices may be utilized for achieving good flow conditions with total flow areas between 0.0002 and 0.0004 square inches.

In further keeping with this embodiment, the protruding terminal end 40 of the electrode 22 is in the form of an acutely angled conical pointed tip designed to promote liquid transition from the circumferentially spaced metering orifices 49*a* and about the electrode terminal end 40 for direction in a pointed thin line or string of liquid droplets. As depicted in FIG. 2 the conical tip tapers inwardly at an acute angle $\alpha$ which may be in the range of 10 to 30 degrees, with an angle of about 15 degrees having been found to achieve optimum liquid direction into a thin line of 0.06 inches or less in width depending on the viscosity of the liquid.

In operation, the liquid dispensing system has been found to be operable for such thin line targeted direction of high viscosity liquids, with viscosities in the range of 150 cP to 525 cP, including lubricants and oils with viscosities in the range of 75 cP to 535 cP. In operation of the illustrated embodiment, the liquid enters the nozzle through the inlet 42 on the side of the body 11 and drips onto the electrode 22. The liquid then cascades down the electrode 22, picking up the charge (free valence electrons) from the electrode 22. As the liquid picks up the charge, repulsion forces break the surface tension of the fluid and allow the liquid to thin out. This also acts to accelerate the liquid down the surface of the electrodes. The highest point of energy transfer happens at the pointed tip 40 of the electrode 22 (the smallest cross-sectional area). The metering orifices 49*a* of the nozzle cap 21 are sized to allow just enough liquid onto the pointed tip 40 of the electrode 22 for the applied high voltage while maintaining a controlled flow onto the tip 40. This also gives the liquid additional time to charge. Without such end cap control of the liquid, it has been found that the charged liquid may leave the nozzle more quickly than fluid entering the nozzle potentially causing the electrode 22 to be void of insulating fluid, a condition that can cause a damaging electrical arc between the electrode and the metallic chain conveyor.

From the foregoing, it can be seen that a hydraulic electrostatic spray nozzle assembly and liquid dispensing system utilizing such a spray nozzle assembly is provided that is operable without pressurized air atomization for more reliably and effectively directing pointed thin line high viscosity liquids, such as oil or other lubricants, onto specific target areas. The system is operable for directing precise liquid spray patterns onto small moving targets without wasteful over spraying that can harm the environment and cause costly cleanup, and without the potential for damaging electrical arcing between the electrostatic charging electrode and metal objects being coated.

What is claimed:

1. A liquid dispensing system for dispensing highly viscous liquid onto a target area comprising;

a hydraulic electrostatic spray nozzle assembly having a nozzle body;

an elongated electrode supported within said nozzle body for coupling to an electrical supply and having terminal end protruding in a downstream direction from said nozzle body;

a supply of highly viscous liquid having a viscosity of between 75 cP and 535 cP;

said nozzle body and elongated electrode defining an annular liquid flow passage about said electrode communicating with the downstream terminal end of said electrode;

said nozzle body having a liquid inlet coupled to said supply of highly viscous liquid for directing said highly viscous liquid through said annular liquid flow passage between said electrode and nozzle body for electrostatically charging the highly viscous liquid; and said nozzle body having a downstream end that defines a plurality of circumferentially spaced metering orifices about said electrode for controlling the discharge of the electrostatically charged liquid onto the protruding terminal end of said electrode for direction therefrom in a thin line of viscous liquid onto the target area without prior pressurized air atomization of the liquid.

2. The liquid dispensing system of claim 1 in which said circumferentially spaced metering orifices control the discharge of said highly viscous electrostatically charged liquid onto the terminal end of said electrode for discharge in an uninterrupted thin line.

3. The liquid dispensing system of claim 2 in which said plurality of circumferentially spaced metering orifices control the discharge of said electrostatically charged liquid in a thin line having a width of 0.06 inches or less.

4. The liquid dispensing system of claim 1 in which said supply of highly viscous liquid is a supply of a lubricant.

5. The liquid dispensing system of claim 1 in which said supply of highly viscous liquid is a supply of oil.

6. The liquid dispensing system of claim 1 in which said nozzle body includes a downstream end cap, and said end cap being formed with said circumferentially metering orifices.

7. The liquid dispensing system of claim 1 in which said nozzle body and end cap are made of electrical insulating material.

8. The liquid dispensing system of claim 1 in which said metering orifices extend outwardly of said electrode in half-moon configurations.

9. The liquid dispensing system of claim 1 in which said metering orifices define a total liquid flow area onto the protruding end of the electrode of between 0.0002 and 0.0004 square inches.

10. The liquid dispensing system of claim 1 in which said protruding terminal end of said electrode is in the form of a conical tip for transitioning liquid from the circumferentially spaced metering orifices inwardly along the terminal end of the electrode for discharge of said highly viscous liquid in said thin line.

11. The liquid dispensing system of claim 1 in which said conical tip of the electrode tapers inwardly in a downstream direction at an angle α between 10 and 30 degrees.

12. A lubricant dispensing system for dispensing lubricant onto a target area comprising;

a hydraulic electrostatic spray nozzle assembly having a nozzle body;

an elongated electrode supported within said nozzle body for coupling to an electrical supply and having a conically configured downstream terminal end tapered inwardly in a downstream direction protruding outwardly from said nozzle body;

a supply of oil;

said nozzle body and elongated electrode defining an annular liquid flow passage about said electrode communicating with the downstream terminal end of said electrode;

said nozzle body having a liquid inlet coupled to said supply of oil for directing oil through said annular liquid flow passage between said electrode and nozzle body for electrostatically charging said oil; and said nozzle body having a downstream end that defines a plurality of circumferentially spaced metering orifices about said electrode for controlling the discharge of the electrostatically charged oil onto the protruding terminal end of said electrode for direction therefrom in a thin line of oil onto a target area without prior pressurized air atomization of the oil.

13. The lubricant dispensing system of claim 12 in which said plurality of circumferentially spaced metering orifices control the discharge of said electrostatically charged oil in a thin line having a width of 0.06 inches or less.

14. The lubricant dispensing system of claim 12 in which said supply of oil has a viscosity of between 75 cP and 535 cP.

15. The lubricant dispensing system of claim 12 in which said nozzle body includes a downstream end cap, and said end cap being formed with said circumferentially metering orifices.

16. The lubricant dispensing system of claim 12 in which said metering orifices define a total oil flow area onto the protruding end of the electrode of between 0.0002 and 0.0004 square inches.

17. The lubricant dispensing system of claim 12 in which said conical tip of the electrode tapers inwardly in a downstream direction at an angle between 10 and 30 degrees.

18. The liquid dispensing system of claim 1 in which said circumferentially spaced metering orifices control the discharge of said highly viscous electrostatically charged liquid onto the terminal of said electrode in a thin line of liquid droplets.

* * * * *